United States Patent

[11] 3,575,153

[72] Inventors James T. Hardin
 Lambertville, Mich.;
 William J. Roberts, Toledo, Ohio
[21] Appl. No. 776,337
[22] Filed Nov. 18, 1968
[45] Patented Apr. 20, 1971
[73] Assignee Eltra Corporation
 Toledo, Ohio

[54] REGULATED VOLTAGE CONVERTER
 8 Claims, 2 Drawing Figs.
[52] U.S. Cl. .................................................. 123/148,
 315/209, 321/2, 321/16, 321/18
[51] Int. Cl. ..................................................... F02p 3/06,
 H02p 13/04
[50] Field of Search.......................................... 321/2, 18,
 16, 4, (Inquired); 315/209 (CD), 209 (T);
 123/148 (E); 431/265, (Inquired)

[56] References Cited
 UNITED STATES PATENTS
3,297,009 1/1967 Sasaki et al. .................. 123/148EUX

| 3,318,296 | 5/1967 | Hufton | 315/209CDUX |
| 3,324,351 | 6/1967 | Pahl | 123/148EUX |
| 3,331,034 | 7/1967 | Massoll | 123/148EUX |
| 3,421,069 | 1/1969 | Minks | 321/18X |
| 3,453,521 | 7/1969 | Schultz et al. | 321/18X |
| 3,486,071 | 12/1969 | Hedge | 321/4X |

Primary Examiner—William H. Beha, Jr.
Attorney—D. Henry Stoltenberg

ABSTRACT: A volt-second controlled DC to DC converter for use in capacitive discharge circuits such as flame heater exciters and ignition systems. A transistor switch in series with the primary of a transformer is turned on for a period of time inversely proportional to the supply voltage, thereby resulting in a constant peak primary current which is independent of the supply voltage. When the transistor switch is turned off, the secondary current produced by the collapsing magnetic field charges a capacitor which is connected in a capacitive discharge system.

INVENTORS.
JAMES T. HARDIN
WILLIAM J. ROBERTS
BY
*D. Henry Stoltenberg*
ATTORNEY INVENTORS.
JAMES T. HARDIN
WILLIAM J. ROBERTS
BY
L Henry Stoltenberg
ATTORNEY

REGULATED VOLTAGE CONVERTER

BACKGROUND OF THE INVENTION

This invention relates to a volt-second controlled DC to DC converter for supplying a regulated charge, from an unregulated source, to a capacitor connected in a capacitive discharge circuit.

Capacitive discharge ignition systems generally require a high voltage charging source of direct current for efficient operation. Since the typical capacitive discharge ignition system is operated from a 12-volt storage battery, a DC to DC converter is required to supply the required charging voltage. The converters used in many present day capacitive discharge systems comprise a transistor oscillator which supplies an alternating current to a power transformer. The transformer output is rectified and used to charge a capacitor. This arrangement typically has little or no regulation. Unless the converter is regulated, even a small change in the supply voltage will result in a large change in the output voltage. When the ignition system is used in an automobile, the supply voltage may vary from 4 volts or less while the engine is cranked to 14 volts or more while the battery is charged.

One improved form of regulated converter currently available and described in U.S. Pat. No. 3,316,448 includes a transistor oscillator, a power transformer and a control circuit. The control circuit has a transistor switch which, during each half cycle of the oscillator, changes the apparent primary center tap in response to changes in supply voltage. The transformer output may be rectified and supplied to a capacitor discharge ignition system. This circuit requires a power transformer having three primary windings, one of the windings having a number of taps, and a large number of parts which result in a relatively expansive converter.

SUMMARY OF THE INVENTION

The present invention relates to a volt-second controlled DC to DC converter for charging a capacitor connected in a capacitive discharge circuit. The basic converter includes an unregulated direct current power source, the primary winding of a power transformer and a transistor switch connected in a closed series circuit. A control circuit turns the transistor switch on each cycle for a period of time inversely proportional to the supply voltage. Thus, the peak primary current in the transformer is independent of the supply voltage and a fixed quantity of energy is stored in the magnetic field of the transformer during each cycle. When the transistor switch is turned off, the collapsing magnetic field produces a secondary voltage which charges a capacitor through a diode. Two embodiments of the invention are described.

In the first embodiment, the converter is used in an exciter circuit for flame heaters, oil burners and the like. The transistor switch is operated by a free-running multivibrator and is turned on and off during alternate half cycles. The multivibrator is designed such that the half cycle time during which the transistor switch is off is independent of the supply voltage while the half cycle time during which the transistor switch is on is inversely proportional to the supply voltage. When the transistor switch is turned off, the collapsing magnetic field in the power transformer produces a secondary voltage which charges a capacitor through a diode. The capacitor is connected in a closed series circuit with a fixed spark gap and the primary of an ignition coil. When the voltage across the capacitor reaches a predetermined level, the spark gap breaks down, and the capacitor discharges through the ignition coil primary, producing a high secondary voltage which is applied to a spark plug.

In the second embodiment, the converter is modified for use in a capacitive discharge ignition system for internal combustion engines. The system is triggered either by points on the engine or by such other suitable pulse source which is synchronized with the engine. When a trigger pulse is received, a monostable multivibrator turns on the transistor switch for a period of time inversely proportional to the supply voltage. When the switch is turned off, the collapsing magnetic field produces a secondary voltage which charges a capacitor through a diode, A silicon controlled rectifier, connected in series with the capacitor and the primary of an ignition coil, is fired by the trigger pulse at the beginning of each cycle to discharge the capacitor through the ignition coil, thereby producing a synchronized high voltage pulse at the engine spark plugs.

It is a primary object of this invention to provide an improved DC to DC converter for charging a capacitor in a capacitive discharge circuit.

Another object of this invention is to provide an improved capacitive discharge exciter circuit for flame heaters, oil burners and the like.

Still another object of this invention is to provide an improved capacitive discharge ignition system for internal combustion engines.

Other objects an advantages of this invention will become apparent from the following detailed description of preferred embodiments thereof, reference being made to the accompanying drawings.

DESCRIPTION OF THE PREFERRED EMBODIMENTS

Figure 1:
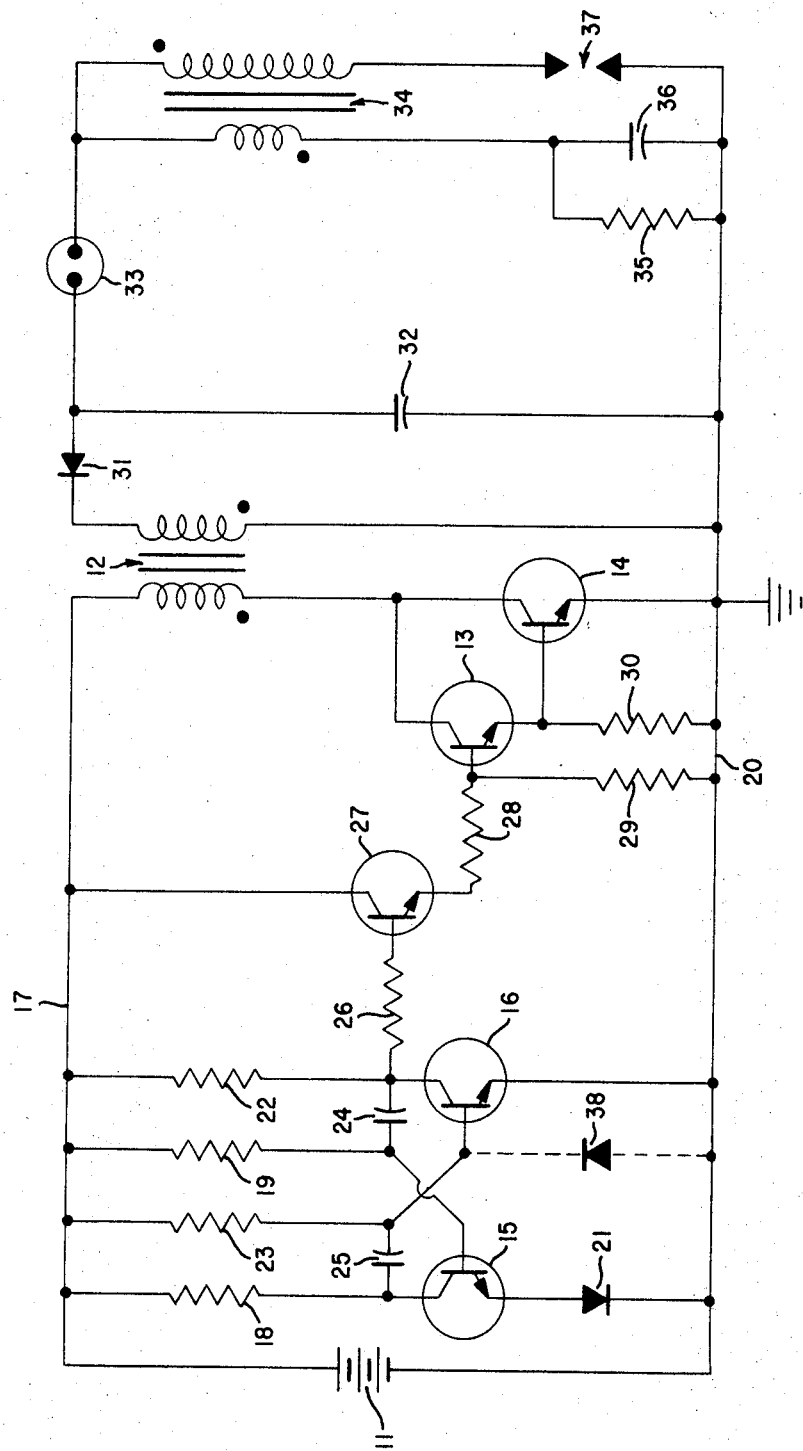
FIG. 1 is a schematic circuit diagram of a capacitive discharge flame heater exciter embodying the instant invention.

Referring now to FIG. 1, a circuit diagram of a flame heater exciter embodying the instant invention is shown. The flame heater exciter is designed for operation from a battery 11, or other low voltage direct current power source. The battery 11 is connected in a closed series circuit with the primary winding of a transformer 12 and a transistor switch including compound-connected transistors 13 and 14. A control portion of the circuit periodically switches the transistors 13 and 14 into a conducting state, allowing current to build up on the primary of the transformer 12. The transistors 13 and 14 remain in the conducting state for a period of time inversely proportional to the voltage applied by the battery 11, so that the peak current in the primary of the transformer 12 approaches a constant value and, during each cycle, a fixed quantity of energy is stored in the magnetic field of the transformer 12 regardless of fluctuations in the voltage of the battery 11.

The control portion of the circuit is basically an astable or free-running multivibrator including a pair of transistors 15 and 16. The collector of the transistor 15 is connected to the high voltage terminal 17 of the battery 11 through a resistor 18, while the base of the transistor 15 is connected to the high voltage terminal 17 through a resistor 19. The emitter of the transistor 15 is connected to a common ground terminal 20 through a diode 21. The collector of the transistor 16 is connected to the high voltage terminal 17 through a resistor 22 and the base of the transistor 16 is connected to the high voltage terminal 17 through a resistor 23 and to the ground terminal 20 through an optional diode 38. The emitter of the transistor 16 is connected directly to the ground terminal 20. The base of the transistor 15 is also connected to the collector of the transistor 16 through a capacitor 24 and the base of the transistor 16 is connected to the collector of the transistor 15 through a capacitor 25.

The operation of the multivibrator may be analyzed by considering the voltage across the capacitors 24 and 25. The capacitor 24 charges to approximately the voltage ($V$) of the battery 11 while the transistor 16 is off and the transistor 15 is on. When the transistor 16 is turned on, this voltage is applied to the emitter-base junction of the transistor 15 and the series diode 21, so that the transistor 15 is held off. Current then flows through the resistor 19, the capacitor 24 and the transistor 16, so that the voltage across the capacitor 24 changes from $V$ in one direction towards $V$ in the other direction. At some capacitor voltage near zero, the emitter-base junction of the transistor 15 will be forward biased, and the transistor 15 will be switched on, shutting the transistor 16 off. The time required for this portion of the cycle is approximately 0.69 RC where $R$ is the value of the resistor 19 and $C$ is the value of the capacitor 24. This is the approximate time required for the capacitor 24 to charge half way from an initial voltage to a final voltage. Therefore, the off time of the transistor 15 does not vary with the supply voltage $V$. When the transistor 16 is on, the capacitor 25 charges to approximately the voltage $V$. When the transistor 16 turns off and the transistor 15 turns on, the voltage on the capacitor 25 is applied directly to the emitter-base junction of the transistor 16. The transistor 16 may be selected such that the emitter-base breakdown voltage is much smaller than the voltage $V$, or the diode 38 may be used. Thus, when the transistor 15 is on, the voltage across the capacitor 25 decreases rapidly to the emitter-base breakdown voltage of the transistor 16, or to the forward drop of the diode 38, if the diode 38 is used. The capacitor 25 must then charge through a fixed voltage interval smaller than the voltage $V$. The time required to charge the capacitor 25 decreases with an increasing battery 11 voltage $V$, so that the transistor 16 is off for a period of time inversely proportional to the battery voltage $V$.

The collector of the transistor 16 is connected through a bias resistor 26 to the base of a transistor 27. The transistor 27 serves as an amplifier for driving the switch including the compound-connected transistors 13 and 14. The collector of the transistor 27 is connected to the high voltage battery terminal 17 while the emitter is connected through series resistors 28 and 29 to the ground terminal 20. The transistor 27 is biased into a conducting state whenever the transistor 16 is nonconducting. When the transistor 27 conducts, a voltage determined by a voltage divider including the resistors 28 and 29 is applied to the base of the transistor 13.

As previously stated, current in the primary of the transformer 12 is controlled by a transistor switch including compound-connected transistors 13 and 14. The collectors of the transistors 13 and 14 are connected to one terminal of the primary winding of the transformer 12. The emitter of the transistor 13 is connected to the base of the transistor 14. The base of the transistor 14 is connected to the ground terminal 20 through a resistor 30. The emitter of the transistor 14 is connected directly to ground terminal 20. The transistors 13 and 14 are biased in the on or conducting state whenever the transistor 27 is conducting. The amplifier transistor 27 and the compound-connected switching transistors 13 and 14 are used to raise the switching capabilities to the required voltage and current levels.

A diode 31 prevents current from flowing in the secondary winding of the transformer 12 while current is building up in the primary winding of the transformer 12. When the transistors 13 and 14 are switched off, the collapsing magnetic field in the transformer 12 produces a secondary voltage which charges a storage capacitor 32 through the diode 31. The capacitor 32 receives additional charge during each cycle of the multivibrator. A fixed spark gap 33, the primary winding of an ignition coil 34 and a resistor 35 are connected in a closed series circuit with the capacitor 32. When the capacitor 32 is charged to a predetermined level, the spark gap 33 breaks down, allowing the capacitor 32 to discharge through the primary winding of the ignition coil 34. The resistor 35 is bypassed by a parallel capacitor 36. One side of the secondary of the ignition coil 34 is connected in common with one side of the primary of the ignition coil 34 to a terminal of the spark gap 33 while the other side of the secondary of the ignition coil 34 is connected through a spark plug 37 to ground terminal 20. When the spark gap 33 breaks down, a high voltage is produced in the secondary winding of the ignition coil 34, which breaks down the gap in the spark plug 37. After the high voltage breaks down the gap in the spark plug 37, the capacitor 32 and the secondary winding of the ignition coil 34 oscillate at a low frequency until the system energy becomes too low to maintain the arcs in the spark gap 33 and the spark plug 37. The capacitor 36 has a high reactance which prevents the flow of high primary currents during the low frequency oscillation.

Figure 2:
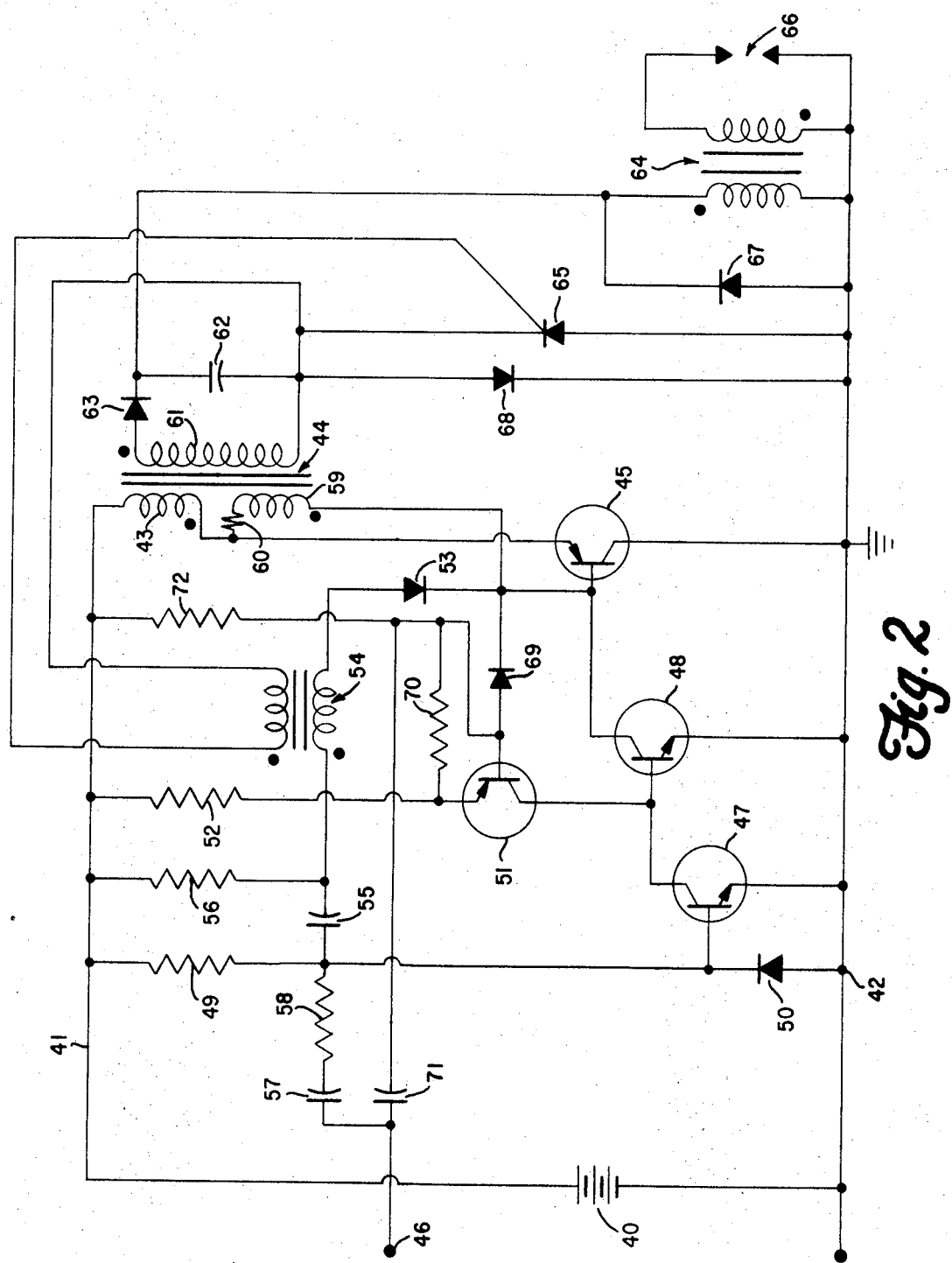
FIG. 2 is a schematic circuit diagram of a capacitive discharge ignition system for an internal combustion engine embodying the instant invention.

Referring now to FIG. 2, the converter is shown in a capacitive discharge ignition system for an internal combustion engine. The ignition system is operated from a storage battery 40 which is connected between a high voltage terminal 41 and a common ground terminal 42. The battery 40 is connected in a closed series circuit with a primary winding 43 of a power transformer 44 and a normally off or nonconducting switching transistor 45. The transistor 45 is turned on by a control circuit, in response to a trigger pulse applied to an input terminal 46, and the transistor 45 remains on for a period of time inversely proportional to and dependent on the unregulated voltage $V$ of the battery 40.

The trigger pulse, which is applied to the input terminal 46, is synchronized with the internal combustion engine. The trigger pulse can be generated by conventional points, a magnetic inductive, photoelectric or other type of contactless pickup, the details of which are well known to those skilled in the art.

The control circuit generally comprises a modified monostable multivibrator including a normally conducting transistor 47 and a normally nonconducting transistor 48. The base of the transistor 47 is connected through a resistor 49 to the high voltage terminal 41 and to the ground terminal 42 through a reverse biased diode 50. The emitter of the transistor 47 is connected to the ground terminal 42 and the collector is connected to the base of the transistor 48. The collector of the transistor 47 and the base of the transistor 48 are also connected through a normally nonconducting transistor 51 and a resistor 52 to the high voltage terminal 41. The function of the transistor 51 will be discussed below. The emitter of the transistor 48 is connected to the common ground terminal 42. The collector of the transistor 48 is connected to the base of the current switching transistor 45 and is also connected through a series connected diode 53, the primary winding of a trigger transformer 54 and a capacitor 55 to the base of the transistor 47. A bias resistor 56 is connected from the high voltage terminal 41 to a common point between the capacitor 55 and the primary winding of the trigger transformer 54.

When the multivibrator is in the stable state, the transistor 47 is held on by current flowing through the resistor 49, the transistor 48 is held off, and the capacitor 55 is charged through the resistor 56 to approximately the supply voltage $V$. To start a cycle, a negative pulse from the triggering circuit at input terminal 46 is applied through a series connected capacitor 57 and a resistor 58 to the base of the conducting transistor 47 and through a capacitor 71 to the base of the nonconducting transistor 51. The transistor 47 momentarily loses base current and turns off, and the transistor 51 turns on. Current flow through the resistor 52 and the conducting transistor 51 turns the transistor 48 on, discharging the capacitor 55 through the primary winding of the transformer 54, the diode 53, and the conducting transistor 48. While the transistor 48 remains on, the transistor 51 is held on by base current through the diode 69. As the capacitor 55 discharges, the voltage at the base of the transistor 47 is set at a level that is below ground by the forward voltage drop of the diode 50. While the transistor 48 is on, the supply voltage $V$ is applied to timing components including the resistor 49 and the capacitor 55. Current through the resistor 49 gradually increases the voltage at the base of the transistor 47 from its initial negative value to a positive value sufficient to turn the transistor 47 back on, returning the system to its stable state.

As previously stated, the time interval during which the transistor 47 remains off and the transistor 48 remains on, after a negative trigger pulse is applied to the input terminal 46, is inversely proportional to the unregulated voltage $V$ of the battery 40. The time interval is accurate if the corresponding change in the voltage across the capacitor 55 is small compared to the applied voltage $V$. When the change in the capacitor voltage is small, the product of the applied voltage $V$ and the time increment is approximately equal to a constant. In the circuit of FIG. 2, the voltage change on the capacitor 55 is equal to the forward voltage drop of the diode 50 plus the forward base-emitter voltage of the transistor 47, which is sufficiently small that acceptable regulation can be maintained with a supply voltage as low as 4 volts.

The current switching transistor 45 is connected to the output of the multivibrator such that the transistor 45 conducts when the transistor 48 is conducting. A winding 59 on the transformer 44 along with a series resistor 60 is used to raise the base voltage of the transistor 45 slightly above the emitter voltage when the emitter-collector voltage is highest, to minimize leakage. The series resistor 60 limits the winding current to avoid excessive losses. Therefore, it can be seen that the transistor 45 becomes conductive in response to a trigger pulse supplied to the input terminal 46, allowing a current to build up in the primary winding 43 of the transformer 44. Since the transistor 45 remains conductive for a period of time inversely proportional to the voltage $V$ of the battery 40, the current in the primary winding 43 will build up to a regulated maximum current. When the transistor 45 is switched off, the collapsing magnetic field in the transformer 44 establishes a voltage in a secondary winding 61 of the transformer 44, which charges a capacitor 62 through a charging diode 63. The charging diode 63 prevents the capacitor 62 from being charged by a voltage across the secondary winding 61 while current is building up in the primary winding 43 of the transformer 44.

The capacitor 62 is connected in a conventional capacitive discharge circuit with the primary winding of an ignition coil 64 and the input and output terminals of a silicon controlled rectifier 65. The secondary winding of the trigger transformer 54 is connected between the input terminal and the control terminal of the silicon controlled rectifier 65. When a trigger pulse is first applied to the input terminal 46, the multivibrator changes state and the capacitor 55 discharges through the primary winding of the trigger transformer 54. This produces a trigger signal in the secondary winding of the trigger transformer 54 which fires the silicon controlled rectifier 65. The capacitor 62 discharges through the primary winding of the ignition coil 64 when the silicon controlled rectifier 65 is fired, producing a high secondary voltage in the ignition coil 64 which is applied to a spark plug 66. A diode 67 is placed in parallel with the primary winding of the ignition coil 64 and a diode 68 is placed in parallel with the silicon controlled rectifier 65. The diodes 67 and 68 prevent ringing of the ignition coil 64 from recharging the capacitor 62 and protect the silicon controlled rectifier 65 from reverse voltages. If the capacitor 62 were allowed to have a nonzero voltage across it before the addition of energy stored in the magnetic field of the transformer 44, the voltage on the capacitor 62 would not reach the expected value.

It can be seen that when a trigger pulse is applied to the input terminal 46, the multivibrator changes state. The capacitor 55 discharges through the primary of the trigger transformer 54 in response to the change of state, firing the silicon controlled rectifier 65 to discharge the capacitor 62 through the primary of the ignition coil 64. Current is simultaneously allowed to build up in the primary winding 43 of the transformer 44. This current buildup continues for a period of time inversely proportional to the voltage $V$ of the battery 40, so that the resultant charge on the capacitor 62 is uniform. The diode 53 and the resistor 56 allow the capacitor 55 to be isolated from the transformer 44 when the transistor 48 turns off at the end of the cycle. The diode 53 prevents the capacitor 55 from sharing the stored energy, and the resistor 56 provides a path for recharging the capacitor 55. The resistor 56 also provides feedback while the system returns to its stable state, since more current is available for the base of the transistor 47 when the transistor 48 turns off.

If there is a decrease in the voltage $V$ supplied by the battery 40, a current will flow through the capacitor 55 away from the base of the transistor 47, which could give a false starting signal. To prevent the converter from starting, the transistor 51 normally blocks the path through which base current flows to the transistor 48. The opposite change in supply voltage would tend to trigger the transistor 51, but any change in supply voltage will be ignored by either the transistor 47 or the transistor 51 and will not start the converter. After the start of a normal cycle, the transistor 51 is held on by current flow through a diode 69 and the transistor 48, so that normal operation is unaffected. A resistor 70, connected between the emitter and the base of the transistor 51, prevents the system from operating at very low voltages. The base of the transistor 51 is also connected to the input terminal 46 through a capacitor 71 and to the high voltage terminal 41 through a bias resistor 72. The diode 69 isolates the transistor 51 from the transformer 44. Although the diode 53 and the diode 69 have similar functions, separate diodes are used so that the capacitor 55 does not slow the recovery of the transistor 51.

At high operating rates, the current through the resistor 56 and the capacitor 55 is still large when the converter is restarted. If the output of the triggering system is suitably limited, a maximum operating rate can be established. Although there is no danger that the triggering system will keep the converter continuously in its unstable state, the current through the transistor 45 can become undesirably high if the supply voltage $V$ is reapplied to the transformer 44 before the current in the secondary winding 61 stops. The capacitor 57 and the resistor 58 establish a maximum operating rate which avoids this.

The principal of the regulated converter of this invention may be advantageously utilized in any system where it is desirable to repetitively charge an energy storage device to a uniform level and where the supply voltage is unregulated. Thus, the converter of this invention may be used for charging a storage capacitor connected in other types of capacitive discharge circuits such as in charging a storage capacitor in a solid state photoflash unit. Other advantageous uses of the invention will be apparent to those skilled in the art.

We claim:

1. An improved converter for a capacitive discharge circuit comprising, in combination, a low voltage source of direct current, a transformer having primary and secondary windings, a switch, means connection said direct current source, said primary winding and said switch in a closed series circuit, a free-running multivibrator, said multivibrator being in a first state for a period of time independent of the voltage of said direct current source and in a second state for a period of time inversely proportional to the voltage of said direct current source, means for turning said switch on while said multivibrator is in said second state and for turning said switch off while said multivibrator is in said first state a charging diode, a storage capacitor, and means connecting said secondary winding, said charging diode and said storage capacitor in a closed series circuit whereby, when said switch is turned on, current builds up in said primary winding to a predetermined peak value and, when said switch changes from an on state to an off state, said storage capacitor is charged.

2. An improved converter for a capacitive discharge circuit, as defined in claim 1, wherein said switch is a transistor switch.

3. An improved converter for a capacitive discharge circuit comprising, in combination, a low voltage source of direct current, a transformer having primary and secondary windings, a switch, means connecting said direct current source, said primary winding and said switch in a closed series circuit, a monostable multivibrator, means for supplying a trigger pulse to said multivibrator, said multivibrator switching from a first state to a second state in response to such trigger pulse and switching back to said first state after a period of time inversely proportional to the voltage of said direct current source, means for turning said switch on while said multivibrator is in said second state and for turning said switch off while said multivibrator is in said first state, a charging diode, a storage capacitor, and means connecting said secondary winding, said charging diode and said storage capacitor in a closed series circuit whereby, when said switch is turned on, current builds up in said primary winding to a predetermined peak value and, when said switch changes from an on state to an off state, said storage capacitor is charged.

4. An improved converter for a capacitive discharge circuit, as defined in claim 1, and including means for preventing said switch from being turned on by fluctuations in the voltage of said direct current source.

5. An improved converter for a capacitive discharge circuit, as defined in claim 1, wherein said switch is a transistor switch.

6. For a capacitive discharge exciter for energizing a spark plug in a flame heater, an improved regulated converter for charging an energy storage capacitor from a low voltage source of direct current, said converter comprising, in combination, a free-running multivibrator said multivibrator being in a first state for a period of time independent of the voltage of said direct current source and in a second state for a period of time inversely proportional to the voltage of said direct current source, a transformer having primary and secondary windings, a transistor switch, means for turning said switch on while said multivibrator is in said second state and for turning said switch off while said multivibrator is in said first state, means connecting said direct current source, said transformer primary winding and said switch in a closed series circuit, a charging diode, and means connecting said transformer secondary winding, said diode and said capacitor in a closed series circuit whereby said capacitor is charged by a voltage produced by a collapsing magnetic field in said transformer.

7. For a capacitive discharge ignition system for an internal combustion engine, an improved regulated converter responsive to synchronized trigger pulses from the engine for charging an energy storage capacitor from a low voltage source of direct current, said converter comprising, in combination, a monostable multivibrator, means for supplying the trigger pulses to said multivibrator, said multivibrator switching from a first state to a second state in response to a trigger pulse and switching back to said first state after a period of time inversely proportional to the voltage of the direct current power source, a transistor switch, means for turning said switch on when said multivibrator is in said second state and for turning said switch off when said multivibrator is in said first state, a power transformer having primary and secondary windings, means connecting said direct current power source, said transformer primary winding and said switch in a closed series circuit, a charging diode, and means connecting said transformer secondary winding, said diode and said capacitor in a closed series circuit, the polarity of said diode being such that the capacitor is charged by a voltage induced in said transformer secondary winding by a collapsing magnetic field in said transformer.

8. For a capacitive discharge ignition system for an internal combustion engine, an improved regulated converter responsive to synchronized trigger pulses from the engine for charging an energy storage capacitor from a low voltage source of direct current, as defined in claim 7, and including means for preventing said switch from being turned on by fluctuations in the voltage of said direct current source.